(12) United States Patent
Kawashima et al.

(10) Patent No.: US 10,797,584 B2
(45) Date of Patent: Oct. 6, 2020

(54) ACTIVE FILTER DEVICE, AIR CONDITIONING DEVICE, AND AIR CONDITIONING SYSTEM

(71) Applicant: DAIKIN INDUSTRIES, LTD., Osaka-shi, Osaka (JP)

(72) Inventors: Reiji Kawashima, Osaka (JP); Takayuki Fujita, Osaka (JP); Masaki Kouno, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 16/335,745

(22) PCT Filed: Jul. 11, 2017

(86) PCT No.: PCT/JP2017/025280
§ 371 (c)(1),
(2) Date: Mar. 22, 2019

(87) PCT Pub. No.: WO2018/061403
PCT Pub. Date: Apr. 5, 2018

(65) Prior Publication Data
US 2019/0238046 A1 Aug. 1, 2019

(30) Foreign Application Priority Data
Sep. 30, 2016 (JP) ................. 2016-192803

(51) Int. Cl.
*H02M 1/12* (2006.01)
*F24F 11/88* (2018.01)
(Continued)

(52) U.S. Cl.
CPC ............. *H02M 1/12* (2013.01); *F24F 11/88* (2018.01); *G05F 1/70* (2013.01); *H02M 1/42* (2013.01);
(Continued)

(58) Field of Classification Search
CPC . F24F 11/88; G05F 1/70; H02M 1/12; H02M 1/42; H02M 1/4208; H02M 7/12; H02M 7/48; Y02B 70/126
(Continued)

(56) References Cited

U.S. PATENT DOCUMENTS 5,047,909 A * 9/1991 Hosoda ................... H02P 27/06
363/40
5,345,375 A * 9/1994 Mohan ...................... H02J 3/01
307/105

(Continued)

FOREIGN PATENT DOCUMENTS

EP 0 610 058 A2 8/1994
JP 63-277427 A 11/1988
(Continued)

OTHER PUBLICATIONS

International Search Report issued in PCT/JP2017/025280 (PCT/ISA/210), dated Aug. 29, 2017.
(Continued)

*Primary Examiner* — Daniel Kessie
*Assistant Examiner* — Brian K Baxter
(74) *Attorney, Agent, or Firm* — Birch, Stewart, Kolasch & Birch, LLP (57) ABSTRACT

A current source capable of generating a current of a first compensation portion for either or both reducing a harmonic current in an air conditioner or improving a fundamental power factor in the air conditioner is provided. If an excess of the current source is larger than a second compensation portion for either or both reducing a harmonic current in a power receiving path of a distribution board or improving a fundamental power factor in the power receiving path of the distribution board, a current obtained through superimposition of a current of a second compensation component and
(Continued)

a current of the first compensation component is generated in the current source.

6 Claims, 3 Drawing Sheets

(51) Int. Cl.
    *H02M 1/42*          (2007.01)
    *H02M 7/12*          (2006.01)
    *G05F 1/70*           (2006.01)
    *H02M 7/48*          (2007.01)

(52) U.S. Cl.
    CPC ........... *H02M 1/4208* (2013.01); *H02M 7/12* (2013.01); *H02M 7/48* (2013.01); *Y02B 70/126* (2013.01)

(58) Field of Classification Search
    USPC .......................................................... 307/31
    See application file for complete search history.

(56) References Cited

U.S. PATENT DOCUMENTS

| | | | | |
|---|---|---|---|---|
| 5,499,178 | A * | 3/1996 | Mohan | H02J 3/01 307/105 |
| 6,380,715 | B1 * | 4/2002 | Kubo | H01M 10/44 320/128 |
| 2006/0044850 | A1 * | 3/2006 | Wu | H02J 3/01 363/41 |
| 2007/0103947 | A1 * | 5/2007 | Taguchi | H02M 1/4225 363/45 |
| 2008/0219035 | A1 * | 9/2008 | Wu | H02J 3/1842 363/41 |
| 2010/0073975 | A1 * | 3/2010 | Ha | H02M 1/4216 363/89 |
| 2011/0148202 | A1 * | 6/2011 | Rada | G05F 1/70 307/52 |
| 2012/0104850 | A1 * | 5/2012 | Fallis | H02J 13/0075 307/31 |
| 2012/0185185 | A1 * | 7/2012 | Bae | H04Q 9/00 702/58 |
| 2014/0184315 | A1 * | 7/2014 | Wallace | H02M 1/126 327/532 |
| 2019/0252881 | A1 * | 8/2019 | Kono | H02J 3/01 |
| 2019/0260304 | A1 * | 8/2019 | Ogawa | H02M 7/12 |

FOREIGN PATENT DOCUMENTS

| | | | |
|---|---|---|---|
| JP | 63277427 | A * | 11/1988 |
| JP | 7-36554 | U | 7/1995 |
| JP | 8-140267 | A | 5/1996 |
| JP | 8-182197 | A | 7/1996 |
| JP | 2010-193651 | A | 9/2010 |
| JP | 2011-172484 | A | 9/2011 |
| JP | 2015-055466 | A | 3/2015 |
| JP | 2016-116330 | A | 6/2016 |

OTHER PUBLICATIONS

Extended European Search Report dated May 7, 2020 in corresponding European Application No. 17855361.6.
Khadem, et al. "Parallel operation of inverters and active power filters in distributed generation system—A review", Renewable and Sustainable Energy Reviews, vol. 15, No. 9, Jun. 24, 2011, pp. 5155-5168, XP028120715.

* cited by examiner

ACTIVE FILTER DEVICE, AIR CONDITIONING DEVICE, AND AIR CONDITIONING SYSTEM

TECHNICAL FIELD

The present invention relates to an active filter device, an air conditioner, and an air conditioning system.

BACKGROUND ART

In an air conditioner and other devices, an active filter device may be provided in order to prevent a harmonic current from flowing out into an electric power system (e.g., a power system including a commercial power source) (see, for example, Patent Document 1).

CITATION LIST

Patent Document

[Patent Document 1] Japanese Unexamined Patent Publication No. 2016-116330

SUMMARY OF THE INVENTION

Technical Problem

However, a load (for example, an apparatus including, e.g., an inverter circuit such as an elevator) other than an air conditioner may be connected to an electric power system to which the air conditioner is connected. Such a load other than the air conditioner may be a source of a harmonic current. In this case, only dealing with the harmonic current from the air conditioner is insufficient, and it is desired to deal with the harmonic current from the air conditioner and the other devices. In addition, improvement in fundamental power factor is required in order to reduce, e.g., facility capacity and energy.

In view of the foregoing background, it is therefore an object of the present invention to provide a technique of, in a situation where an air conditioner and another load are connected together, either or both reducing a harmonic current or improving a fundamental power factor.

Solution to the Problem

In order to solve the above problem, a first aspect of the present invention is directed to an active filter device connected to a power converter (11) to be supplied with electric power via a distribution board (60), the active filter device comprising: a current source (30) having an output connected to a power receiving path (12) of the power converter (11), the current source (30) being capable of generating a current of a first compensation portion (i1) for either or both reducing a harmonic current in the power converter (11) or improving a fundamental power factor in the power converter (11); and a controller (40), if an excess (res) which is a difference between an output current capacity (Cap) of the current source (30) and the first compensation portion (i1) is larger than a second compensation portion (i2) for either or both reducing a harmonic current in a power receiving path (61) of the distribution board (60) or improving a fundamental power factor in the power receiving path (61) of the distribution board (60), allowing the current source (30) to generate a current obtained through superimposition of a current of the second compensation portion (i2) and the current of the first compensation portion (i1).

In this configuration, if the active filter device (20) has an excess capacity, a current of the first compensation portion (i1) and a current of the second compensation portion (i2) are superimposed and supplied to either or both reduce the harmonic current or improve the fundamental power factor.

A second aspect is an embodiment of the first aspect. In the second aspect, if the second compensation portion (i2) is equal to or larger than the excess (res), the controller (40) allows the current source (30) to generate a current corresponding to the output current capacity (Cap).

In this configuration, if the active filter device (20) has no excess capacity, at least one of the reduction in the harmonic current or the improvement in the fundamental power factor is performed depending on the ability of the current source (30).

A third aspect of the present invention is an embodiment of the first or second aspect of the present invention. In the third aspect, active filter device further includes: a first current value detector (41) detecting a current value in the power receiving path (12) of the power converter (11); and a second current value detector (42) detecting a current value in the power receiving path (61) of the distribution board (60).

A fourth aspect is an embodiment of the third aspect. In the fourth aspect, at least one of the first current value detector (41) or the second current value detector (42) transmits the current value to the controller (40) in a wireless system.

This configuration allows for omitting the wiring by employing the wireless system.

A fifth aspect is an air conditioner comprising the active filter device (20) of any one of aspects 1 to 4.

A sixth aspect is an air conditioning system comprising: the active filter device (20) of any one of claims 1 to 4, the active filter device (20) including a plurality of active filter devices (20); and a plurality of air conditioners (10). If a sum (S) of the excesses (res) in the active filter devices (20) is larger than the second compensation portion (i2), the active filter devices (20) each generate a current obtained through superimposition of, instead of the current of the second compensation portion (i2), a current of a share compensation portion (i3) for generating a part of the second compensation portion (i2) in a shared manner on the current of the first compensation portion (i1).

In this configuration, a plurality of active filter devices (20) perform at least one of a reduction in harmonic current or an improvement in fundamental power factor.

A seventh aspect is an embodiment of the sixth aspect. In the sixth aspect, each of the active filter devices (20) is incorporated into an associated one of the air conditioners (10).

Advantages of the Invention

According to the first aspect, in a situation where the air conditioner and another load are connected together, it is possible to either or both reduce the harmonic current or improve the fundamental power factor.

Further, according to the second aspect, in a situation where the air conditioner and another load are connected together, within a range corresponding to the ability of the current source (30), it is possible to either or both reduce the harmonic current or improve the fundamental power factor.

In addition, according to the fourth aspect, an active filter device is easily installed.

According to the fifth aspect, it is possible to obtain the above-described advantage by an active filter device incorporated in an air conditioner.

Further, according to the sixth aspect, by using a plurality of active filter devices, it is possible to more reliably obtain the above-described advantage.

According to the seventh aspect, it is possible to obtain the above-described advantage by an active filter device incorporated in an air conditioner.

DESCRIPTION OF EMBODIMENTS

Embodiments of the present invention will be described in detail below with reference to the drawings. The embodiment described below is merely an exemplary one in nature, and is not intended to limit the scope, applications, or use of the invention.

First Embodiment

Figure 1:
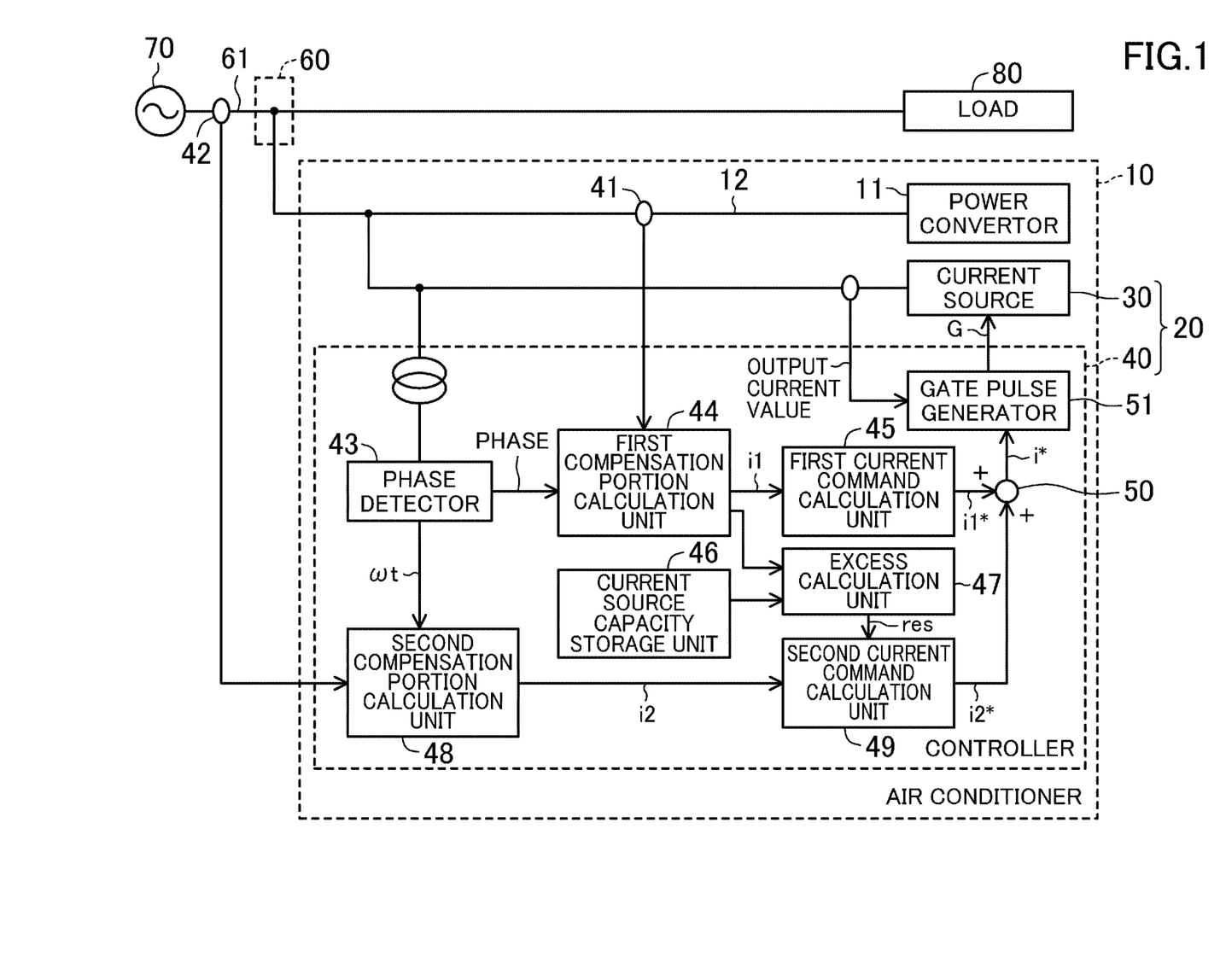
FIG. 1 is a block diagram showing an air conditioner according to a first embodiment.

FIG. 1 is a block diagram showing an air conditioner (10) according to a first embodiment of the present invention. The air conditioner (10) is installed in, e.g., a building, a factory, a condominium, or a separate house (hereinafter referred to as a building or the like), and performs air conditioning (cooling or heating) in an indoor space. A building or the like in which the air conditioner (10) is installed is supplied with electric power from an electric power system including an AC power source (70). Such a building or the like is provided with a distribution board (60) connected to the AC power source (70) and receiving AC power from the AC power source (70). The distribution board (60) includes a plurality of breakers, and distributes AC power from the AC power source (70) to a plurality of devices via the respective breakers. In this example, the air conditioner (10) is connected to one of the breakers. The air conditioner (10) is operated by the AC power supplied through the distribution board (60).

Further, in addition to the air conditioner (10), a load (80) is also connected to the distribution board (60). In this example, it is assumed that the load (80) includes a circuit which can be a source of a harmonic current such as an inverter circuit. Examples of the load (80) include an elevator provided in a building, an illumination device such as an LED, and another air conditioner different from the air conditioner (10).

<Air Conditioner (10)>

The air conditioner (10) includes a refrigerant circuit (not shown) having a compressor, a power converter (11), and an active filter device (20). The power converter (11) is connected to the AC power source (70) via the distribution board (60). The power converter (11) includes a converter circuit and an inverter circuit which are not shown. The power converter (11) converts AC power, supplied to the power converter (11), into AC power having a desired frequency and a desired voltage. The converted AC power is supplied to the compressor (more specifically, an electric motor included in the compressor). This allows the compressor to operate and the refrigerant circuit to operate, such that air in the indoor space is conditioned.

When the power converter (11) and the electric motor in the compressor are operated in the air conditioner (10), a harmonic current may be generated. This harmonic current may flow out to the AC power source (70) via a current path (hereinafter referred to as a power receiving path (12)) that supplies electric power from the distribution board (60) to the air conditioner (10). The amount of such a harmonic current flowing out to the AC power source (70) is generally regulated. Therefore, in the air conditioner (10), the active filter device (20) is used to reduce the harmonic current flowing out. In addition, in view of facility capacity and energy saving, an improvement in the fundamental power factor is required. In order to do so, the active filter device (20) according to this embodiment also has the function of improving the fundamental power factor. Hereinafter, a configuration of the active filter device (20) will be described.

<Active Filter Device (20)>

The active filter device (20) is incorporated in the air conditioner (10), and has the function of counteracting a harmonic current appearing in the power receiving path (12) of the power converter (11). In other words, the active filter device (20) allows a current (compensation current) to flow so that a current in a current path connecting the AC power source (70) and the distribution board (60) together (hereinafter referred to as a "power receiving path (61)") approaches a sinusoidal wave. More specifically, the active filter device (20) detects the harmonic current appearing in the power receiving path (12), generates a compensation current having a phase opposite to that of the detected harmonic current, and supplies the compensation current to the power receiving path (12) of the air conditioner (10).

The harmonic current generated in the air conditioner (10) may increase to the maximum level when the load of the air conditioner (10) is largest (for example, at the time of the maximum output of cooling air). Therefore, in the active filter device (20), its ability (the amount of power which can be generated) is set in view of the largest harmonic current at the time of the maximum load of the air conditioner (10). In general, the air conditioner (10) tends to be used at an intermediate load state rather than at the maximum load state. Therefore, the active filter device (20) whose ability is set in this way may have a long period of time in which its capacity is excessive during operation.

In addition, the active filter device (20) has a function of improving the fundamental power factor. In this example, the active filter device (20) has a configuration so as to allow a compensation current which compensates for an invalid component of the fundamental wave to flow, thereby improving the fundamental power factor. In order to allow the active filter device (20) to perform these functions, the active filter device (20) according to this embodiment includes a current source (30) and a controller (40), as shown in FIG. 1.

—Current Source (30)—

The current source (30) generates a current (i.e., a compensation current) for reducing the harmonic current and improving the fundamental power factor. An output terminal of the current source (30) is connected to the power receiving path (12) of the power converter (11), and the compensation current generated is output to the power receiving path (12). The current source (30) in this embodiment includes a so-called inverter circuit. A switching command value (G) which will be described later is input to the current source (30), and the current source (30) generates a compensation current by performing switching in accordance with the switching command value (G).

—Controller (40)—

The controller (40) controls an output current of the current source (30). In this example, the controller (40) includes a first current value detector (41), a second current value detector (42), a phase detector (43), a first compensation portion calculation unit (44), a first current command calculation unit (45), a current source capacity storage unit (46), an excess calculation unit (47), a second compensation portion calculation unit (48), a second current command calculation unit (49), an adder (50), and a gate pulse generator (51). This controller (40) may include, e.g., a microcomputer and a memory device storing a program for operating the microcomputer.

The first current value detector (41) detects a current value in the power receiving path (12) of the power converter (11). The current value detected by the first current value detector (41) is transmitted to the first compensation portion calculation unit (44). The first current value detector (41) may be configured as, but not limited to, a current transformer, for example. The first current value detector (41) may be configured to transmit a detection value in a wired system, or may be configured to transmit the detection value in a wireless system.

The second current value detector (42) detects a current value in the power receiving path (61) connecting the AC power source (70) and the distribution board (60) together. The current value detected by the second current value detector (42) is transmitted to the second compensation portion calculation unit (48). The second current value detector (42) may be configured as, but not limited to, a current transformer, for example. The second current value detector (42) may be configured to transmit a detection value in a wired system, or may be configured to transmit the detection value in a wireless system. Further, the second current value detector (42) may be provided in the distribution board (60).

The phase detector (43) detects a phase ($\omega t$) of the current in the power receiving path (12), and transmits the detected phase ($\omega t$) to the first and second compensation portion calculation units (44) and (48).

Based on the phase ($\omega t$) detected by the phase detector (43) and the current value detected by the first current value detector (41), the first compensation portion calculation unit (44) obtains a value. The value indicates a current value required for compensating for the harmonic current in the power receiving path (12) (reducing the harmonic current) and compensating for the ineffective component of the fundamental wave (improving the fundamental power factor), and is hereinafter referred to as a "first compensation portion (i1)." The first compensation portion calculation unit (44) outputs the first compensation portion (i1) to the first current command calculation unit (45) and the excess calculation unit (47).

The first current command calculation unit (45) generates a first current command value (i1*) according to the first compensation portion (i1), and outputs the first current command value (i1*) to the adder (50). In this example, the first current command calculation unit (45) outputs the first compensation portion (i1) as the first current command value (i1*).

The current source capacity storage unit (46) is configured as a part of a memory device constituting the controller (40). The current source capacity storage unit (46) stores the magnitude of a current that can be compensated by the active filter device (20), i.e., the maximum current value (e.g., a rated value) that can be output from the current source (30). Here, the value stored in the current source capacity storage unit (46) is referred to as an "output current capacity (Cap)." Then, the excess calculation unit (47) obtains a difference (hereinafter referred to as an "excess (res)") between the output current capacity (Cap) and the first compensation portion (i1), and outputs the calculated excess (res) to the second current command calculation unit (49). That is, the excess (res) is shown as follows:

Excess (res)=Output Current Capacity (Cap)−First Compensation Portion (i1)

Based on the phase ($\omega t$) detected by the phase detector (43) and the current value detected by the second current value detector (42), the second compensation portion calculation unit (48) obtains a value. The value indicates a current value required for compensating for the harmonic current in the power receiving path (61) (reducing the harmonic current) and compensating for the ineffective component of the fundamental wave (improving the fundamental power factor), and is hereinafter referred to as a "second compensation portion (i2)." The second compensation portion calculation unit (48) outputs the second compensation portion (i2) to the second current command calculation unit (49).

The second current command calculation unit (49) generates a second current command value (i2*) according to the excess (res) and the second compensation portion (i2), and outputs the second current command value (i2*) to the adder (50). Specifically, the second current command calculation unit (49) of this embodiment generates the second current command value (i2*) in accordance with the following condition.

(1) If the second compensation portion (i2)≥the excess (res), the second current command value (i2*)=the excess (res).
(2) If the second compensation portion (i2)<the excess (res), the second current command value (i2*)=the second compensation portion (i2).

As can be seen, in this embodiment, the magnitude of the current for use in compensation is determined in accordance with the excess (res).

The adder (50) adds the first current command value (i1*) and the second current command value (i2*) to generate an additional value (hereinafter referred to as a "current command value (i*)"), and outputs the current command value (i*) to the gate pulse generator (51). The gate pulse generator (51) generates a switching command value (G) for instructing to perform switching in the inverter circuit constituting the current source (30). Specifically, the gate pulse generator (51) performs feedback control, i.e., repeating an operation of generating a switching command value (G) based on a deviation between an output current value of the current source (30) and the current command value (i*). As a result, the current source (30) supplies the power receiving path (12) with a current (compensation current) corresponding to the current command value (i*). In other words, the active filter device (20) supplies the power receiving path (12) with a compensation current obtained through superimposition of a current corresponding to the first current command value (i1*) and a current corresponding to the second current command value (i2*).

<Operation of Active Filter Device (20)>

When the air conditioner (10) is started, the active filter device (20) is also active. Then, in the controller (40), the first compensation portion calculation unit (44) obtains the first compensation portion (i1) based on the phase ($\omega t$) detected by the phase detector (43) and the current value detected by the first current value detector (41). Accordingly, the first current command calculation unit (45) generates the first current command value (i1*). Further, the second compensation portion calculation unit (48) obtains the second compensation portion (i2) based on the phase (ωt) detected by the phase detector (43) and the current value detected by the second current value detector (42).

Then, the second current command calculation unit (49) generates the second current command value (i2*). For example, when the second compensation portion (i2)≥the excess (res) (if the ability for compensation is not sufficiently excessive), the second current command calculation unit (49) outputs the excess (res) as the second current command value (i2*) to the adder (50). Since the excess (res)=the output current capacity (Cap)−the first compensation portion (i1), the current command value (i*) generated by the adder (50) is the output current capacity (Cap).

In addition, when the second compensation portion (i2) <the excess (res) (if the ability for compensation is sufficiently excessive), the second current command calculation unit (49) outputs the second compensation portion (i2) as the second current command value (i2*). As a result, the current command value (i*) generated by the adder (50) is a sum of the first compensation portion (i1) and the second compensation portion (i2).

As can be seen, when the current command value (i*) is generated, the gate pulse generator (51) generates the switching command value (G), and the current source (30) supplies the power receiving path (12) with the compensation current corresponding to the current command value (i*). For example, if the ability for compensation is not sufficiently excessive (if the second compensation portion (i2)≥the excess (res)), a current corresponding to the output current capacity (Cap) (in other words, a current obtained through superimposition of the current corresponding to the detection value of the first current value detector (41) and the current corresponding to the excess (res)) flows as a compensation current. This case can reduce the harmonic current caused mainly by the power converter (11) and improve the fundamental power factor. Such a state may be, for example, a state in which the load of the air conditioner (10) is largest (for example, at the time of the maximum output of cooling air).

On the other hand, if the ability for compensation is sufficiently excessive (if the second compensation portion (i2)<the excess (res)), a current obtained through superimposition of the current corresponding to the detection value of the first current value detector (41) and the current corresponding to the detection value of the second current value detector (42) flows as a compensation current. This case can reduce the harmonic current caused not only by the air conditioner (10) but also by another load (80), and improve the fundamental power factor. An excess may be generated in the compensation ability of the active filter device (20) if, for example, the air conditioner (10) is used at an intermediate load state.

Advantages of Embodiment

As described above, this embodiment can reduce the harmonic current in a situation where the air conditioner (10) and another load are connected together. This embodiment can further improve the fundamental power factor.

Second Embodiment

Figure 2:
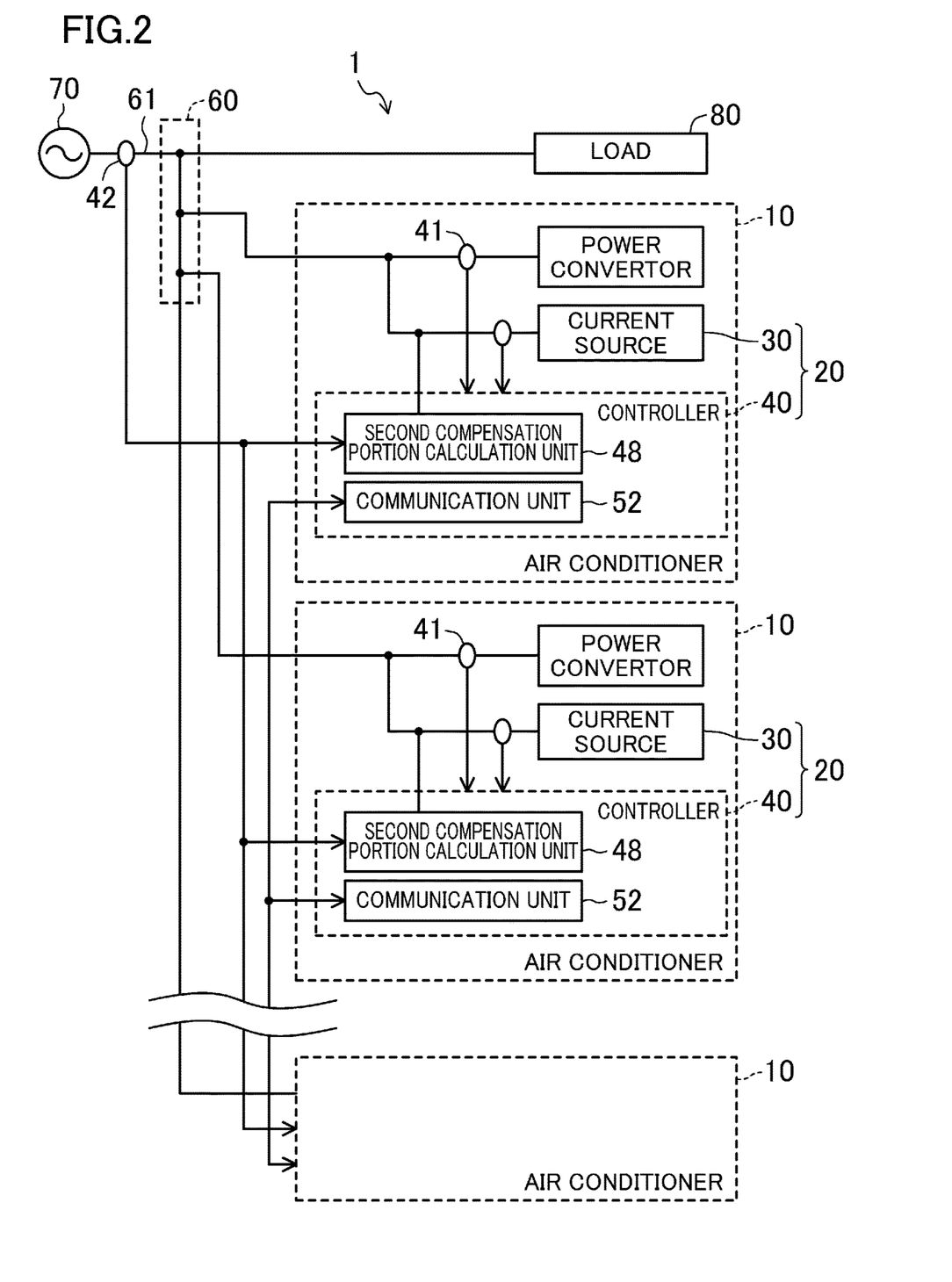
FIG. 2 is a block diagram showing an air conditioning system according to a second embodiment.

FIG. 2 is a block diagram showing an air conditioning system (1) according to a second embodiment. The air conditioning system (1) is provided with a plurality of air conditioners (10). Each of the air conditioners (10) includes a refrigerant circuit (not shown) having a compressor, a power converter (11), and an active filter device (20). In other words, the air conditioning system (1) includes a plurality of active filter devices (20).

In this example, one active filter device (20) is incorporated into one air conditioner (10). Each active filter device (20) has substantially the same configuration as the active filter device (20) of the first embodiment. However, a mechanism for generating a second current command value (i2*) in this embodiment is different from that in the first embodiment. The active filter devices (20) in this embodiment generate the second current command value (i2*) such that each of the active filter devices (20) generate a part of the second compensation portion (i2) in a shared manner.

In order to realize such sharing, the active filter device (20) of this embodiment has a configuration in which a communication unit (52) is added to the active filter device (20) of the first embodiment, and the second current command calculation unit (49) has a modified function as described later. In the controller (40) shown in FIG. 2, only the second compensation portion calculation unit (48) and the communication unit (52) are described, and the description of other components is omitted. Further, as shown in FIG. 2, in the air conditioning system (1), all of the active filter devices (20) share the one second current value detector (42).

In the controller (40) of this embodiment, an output (excess (res)) of the excess calculation unit (47) is input to the communication unit (52) in place of the second current command calculation unit (49). Then, the communication unit (52) of each active filter device (20) transmits the excess (res) obtained by the excess calculation unit (47) to the communication unit (52) of another active filter device (20), and receives the excess (res) transmitted from the communication unit (52) of the another active filter device (20). Communication between the communication units (52) may be implemented in a wired system or a wireless system.

Each communication unit (52) outputs a signal indicating the excess (res) received from another communication unit (52) to the second current command calculation unit (49). Each second current command calculation unit (49) is configured to calculate the sum of the excess (res) of the entire air conditioning system (1) (hereinafter referred to as an "excess sum (S)") using the information of the excess (res) in another active filter device (20) obtained via the communication unit (52). Specifically, each second current command calculation unit (49) calculates the sum of all the excesses (res) of the respective active filter devices (20) received by all the communication units (52) except the associated communication unit (52) and the excesses (res) obtained by the associated excess calculation unit (47).

Further, each second current command calculation unit (49) calculates a share compensation portion (i3) that each active filter device (20) should generate a part of the second compensation portion (i2) in a shared manner based on the excess sum (S) and the second compensation portion (i2) obtained by the associated second compensation portion calculation unit (48). Specifically, in this embodiment, each of the second current command calculation units (49) generates the second current command value (i2*) in accordance with the following condition.

(1) If the second compensation portion (i2)≥the excess (res), the share compensation portion (i3)=the excess (res) obtained by the associated excess calculation unit (47).

(2) If the second compensation portion (i2)<the excess (res), the share compensation portion (i3) appropriately falls within the range of the second compensation portion (i2).

In other words, in this embodiment, when the second compensation portion (i2) is smaller than the excess sum (S), the current of the second compensation portion (i2) is generated by the active filter devices (20) so as to be shared among the active filter devices (20). As a method of sharing compensation current within a range not exceeding the respective excesses (res), the compensation current may be shared equally among the active filter devices (20) or shared according to the ratio of the respective excesses (res) among the active filter devices (20).

Once the share compensation portion (i3) in each active filter device (20) is obtained in this manner, in each active filter device (20), the second current command calculation unit (49) generates the second current command value (i2*) in accordance with the share compensation portion (i3). When the second current command value (i2*) is generated, in each active filter device (20), the first current command value (i1*) and the second current command value (i2*) are added in the same manner as in the active filter device (20) of the first embodiment, thereby generating a current command value (i*). As a result, in each active filter device (20), a compensation current corresponding to the current command value (i*) is generated.

For example, if the second compensation portion (i2)≥the excess sum (S) (if the ability for compensation in the entire air conditioning system (1) is not sufficiently excessive), each of the active filter devices (20) allows a current obtained through superimposition of a current corresponding to the detection value of the first current value detector (41) and a current corresponding to the respective excesses (res) to flow as a compensation current. In other words, if the ability for compensation in the entire air conditioning system (1) is not sufficiently excessive, a reduction in the harmonic current caused by each of the air conditioners (10) and an improvement in the fundamental power fundamental power factor are mainly performed.

On the other hand, if the second compensation portion (i2)<the sum of the excess (S) (if the ability for compensation in the entire air conditioning system (1) is sufficiently excessive), each of the active filter devices (20) allows a current through superimposition of a current corresponding to the detection value of the first current value detector (41) and a current corresponding to the share compensation portion (i3) to flow as a compensation current. Thus, if the ability for compensation in the entire air conditioning system (1) is sufficiently excessive, it is possible to reduce the harmonic current caused not only by the air conditioners (10) but also by the other load (80) and to improve the fundamental power factor.

Advantages of Embodiment

As described above, even this embodiment can reduce the harmonic current and improve the fundamental power factor in a situation where the air conditioner (10) and another load are connected together. Further, since compensation is shared among the active filter devices (20), this embodiment can reduce the harmonic current, more reliably.

In addition, the configuration of this embodiment can be changed so that any one of the active filter devices (20) controls the operation of all other the active filter devices (20). For example, any one of the active filter devices (20) may be configured to determine the share compensation portion (i3) in itself and the all other active filter devices (20) based on the excess sum (S), and transmit that information to the all other active filter devices (20), and the other active filter devices (20) may be configured to operate accordingly.

Third Embodiment

Figure 3:
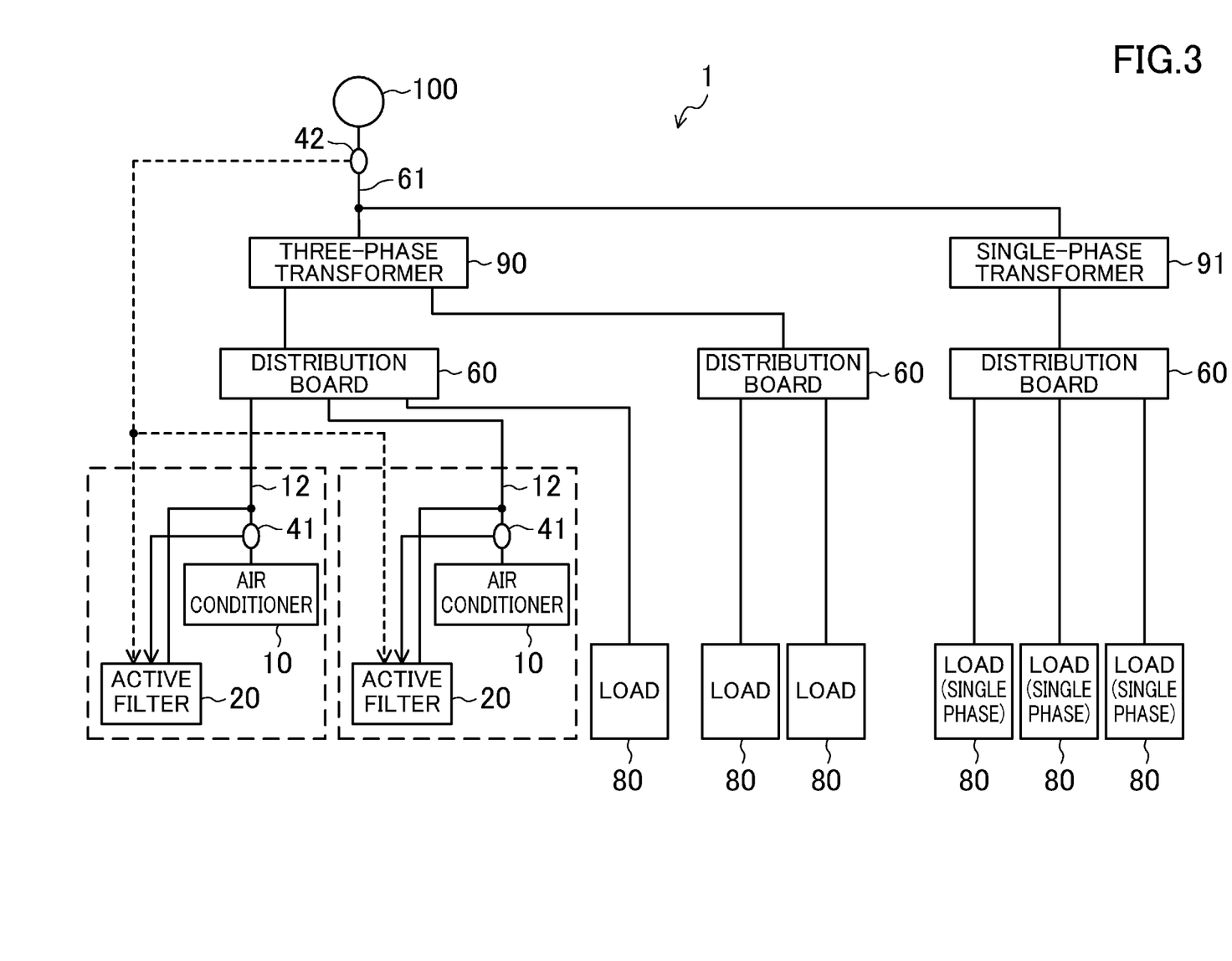
FIG. 3 is a block diagram showing an air conditioning system according to a third embodiment.

FIG. 3 is a block diagram showing an air conditioning system (1) according to a third embodiment. In this example, a building or the like is supplied with electric power from an electric power system including an AC power source (hereinafter, referred to as a "high-voltage AC power source (100)") of high voltage (e.g., 6.6 kV). In this building or the like, an alternating current received from the high-voltage AC power source (100) is converted into a single-phase alternating current having a lower voltage by a single-phase transformer (91), and is supplied to various loads (80).

Further, in this example, an alternating current from the high-voltage AC power source (100) is converted into a three-phase alternating current having a lower voltage than the alternating current by a three-phase transformer (90). The three-phase alternating current obtained through the three-phase transformer (90) is supplied to an air conditioner (10) and a load (80) via a distribution board (60), and is also supplied to another load (80) via a separate distribution board (60).

In this example, as shown in FIG. 3, a plurality of air conditioners (10) are provided which are supplied with a three-phase alternating current. Each air conditioner (10) is provided with an associated one of the active filter devices (20). Each of the active filter devices (20) is configured as a device independent from the air conditioner (10). Thus, the active filter device (20) does not necessarily need to be incorporated into the air conditioner (10) as in the above embodiments.

Also, in this example, all of the active filter devices (20) share the one second current value detector (42). The second current value detector (42) detects a current in the high-voltage AC power source (100). More specifically, the second current value detector (42) is connected to a point closer to the high-voltage AC power source (100) than a point of connection between the three-phase transformer (90) and the single-phase transformer (91) and the high-voltage AC power source (100). The detection value of the second current value detector (42) is transmitted to each of the active filter devices (20) in a wireless system. Of course, the detection value of the second current value detector (42) can be transmitted in a wired system.

The first current value detector (41) is provided for each active filter device (20), and the respective active filter devices (20) detect the current of the power receiving path (12) in the air conditioner (10) corresponding to the active filter device (20).

Then, as in the second embodiment, the current of the second compensation portion (i2) is generated by the active filter devices (20) in a shared manner in this embodiment. Therefore, this embodiment can reduce a harmonic current in a situation where the air conditioner (10) and another load are connected together. This embodiment can further improve the fundamental power factor. In addition, the same or similar advantage can also be obtained if the configuration of this embodiment is modified so as to omit the system closer to the single-phase transformer (91).

Other Embodiments

Note that the active filter device (20) does not necessarily have to include the function of improving the fundamental power factor. In other words, the active filter device (20) may be configured to have only the function of reducing a harmonic current. Instead, the active filter device (20) may be configured to have only the function of improving the fundamental power factor.

One air conditioner (10) may be provided with a plurality of active filter devices (20). In this case, as in the second embodiment, the active filter devices (20) may generate a current of the second compensation portion (i2) in a shared manner.

INDUSTRIAL APPLICABILITY

The present invention is useful as an active filter device, an air conditioner, and an air conditioning system.

DESCRIPTION OF REFERENCE CHARACTERS

1 Air Conditioning System
10 Air Conditioner
12 Power Receiving Path
20 Active Filter Device
30 Current Source
40 Controller
41 First Current Value Detector
42 Second Current Value Detector
60 Distribution Board
61 Power Receiving Path

The invention claimed is:

1. An active filter device connected to a power converter to be supplied with electric power via a distribution board, the active filter device comprising:
   a current source having an output connected to a power receiving path of the power converter, the current source being capable of generating a first current compensation portion for either or both reducing a harmonic current in the power converter or improving a fundamental power factor in the power converter;
   a first detector detecting a first current flowing in the power receiving path of the power converter; and
   a second detector detecting a second current flowing in a power receiving path of the distribution board,
   a controller calculating the first current compensation portion based on the first current value detected by the first detector, calculating, based on the second current value detected by the second detector, a second current compensation portion for either or both reducing a harmonic current in the power receiving path of the distribution board or improving a fundamental power factor in the power receiving path of the distribution board, and allowing the current source to generate an output current obtained through superimposition of the second current compensation portion and the first current compensation portion.

2. The active filter device of claim 1, wherein if the second current compensation portion is equal to or larger than an excess, the controller allows the current source to generate the output current corresponding to the output current capacity.

3. The active filter device of claim 1, wherein at least one of the first detector or the second detector transmits the detected current value to the controller in a wireless system.

4. An air conditioner comprising the active filter device of claim 1.

5. An air conditioning system comprising:
   the active filter device of claim 1, the active filter device including a plurality of active filter devices; and
   a plurality of air conditioners, wherein
   if a sum of excesses, each of which is a difference between an output current capacity from the current source and the first current compensation portion, in the active filter devices is larger than the second current compensation portion, the active filter devices each generate an output current obtained through superimposition of, instead of the second current compensation portion, a share current compensation portion for generating a part of the second current compensation portion in a shared manner on the first current compensation portion.

6. The air conditioning system of claim 5, wherein each of the active filter devices is incorporated into an associated one of the plurality of air conditioners.

* * * * *